No. 609,383. Patented Aug. 16, 1898.
C. ANDERSON.
SWIVEL CONNECTION.
(Application filed Oct. 5, 1897.)
(No Model.)
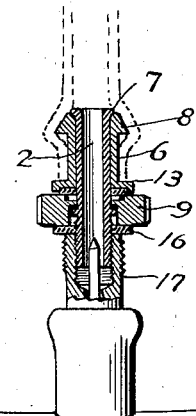
FIG. 1.
FIG. 2.
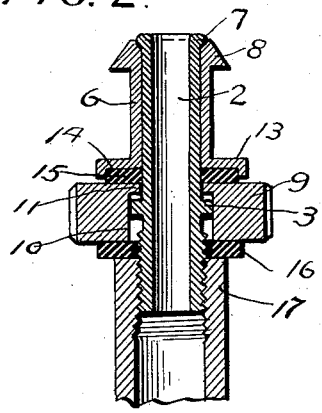
FIG. 3.
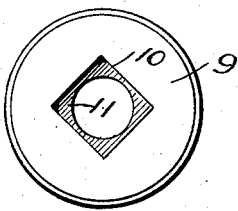
FIG. 4.
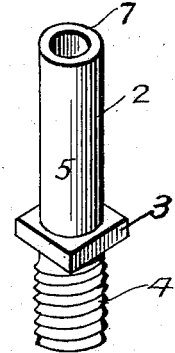
FIG. 5.
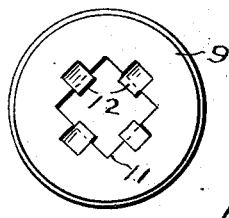
WITNESSES
J Jessen
A. F. Holmes
INVENTOR.
CHARLES ANDERSON.
BY Paul D Hawley
HIS ATTORNEYS.

UNITED STATES PATENT OFFICE.

CHARLES ANDERSON, OF MINNEAPOLIS, MINNESOTA, ASSIGNOR TO THE HEATH-QUIMBY COMPANY, OF SAME PLACE.

SWIVEL CONNECTION.

SPECIFICATION forming part of Letters Patent No. 609,383, dated August 16, 1898.

Application filed October 5, 1897. Serial No. 654,111. (No model.)

*To all whom it may concern:*

Be it known that I, CHARLES ANDERSON, of the city of Minneapolis, county of Hennepin, State of Minnesota, have invented certain new and useful Improvements in Swivel Connections, of which the following is a specification.

My invention relates to swivel connections principally designed for use between two sections of hose; and the object of the invention is to provide a swivel connection which will allow the free adjustment of the connection without the turning or twisting of the hose or pipe sections and which when tightened will have its parts automatically drawn together to prevent leakage at any point in the swivel connection.

The particular object of the invention is to provide a swivel connection adapted for use upon the end of a bicycle-pump hose or nipple.

My invention consists generally in the combination, with a tubular body or sleeve having a threaded end, of a nut or collar fixed against rotation upon said body or sleeve, but adapted to move longitudinally thereon, and a swivel-sleeve provided upon said body between the end thereof and said nut or collar, all substantially as hereinafter described, and particularly pointed out in the claims.

The invention will be more readily understood by reference to the accompanying drawings, forming part of this specification, and in which—

Figure 1 is a sectional view illustrating a swivel connection embodying my invention, showing the same attached to a bicycle valve-stem. Fig. 2 is an enlarged sectional view of the swivel connection. Fig. 3 is an end view of the slidable collar or nut. Fig. 4 is a perspective view of the tubular body or sleeve, and Fig. 5 shows a modified form of the collar or nut.

In the drawings, 2 represents a tubular sleeve or body, which about midway of its length is provided with a square or polygonal shoulder or collar. (Shown plainly in Fig. 4.) One portion 4 of the body 2 is threaded, while the other portion 5 has a smooth round surface to receive the swivel-sleeve 6, which sleeve is held in place, preferably, by upsetting or flanging the end 7 of the body 2. The sleeve 6 is provided with one or more annular barbs or beads 8 to firmly hold the rubber hose which is placed over the swivel-sleeve 6. The rubber connection is shown by dotted lines in Fig. 1. Before the sleeve 6 is put on and before the end of the body is flanged or peened the collar or nut 9 is slipped down over the end of the body 2. This collar is provided with a square hole 10 to fit the square shoulder or collar 3, formed on the body 2, so that the nut or collar cannot turn upon the body 2, though it is adapted to a slight longitudinal movement thereon. A web 11 upon the top of the nut or collar 9 engages the top of the square collar 3 and prevents the part 9 from being lost. The web 11, with the round hole therein, may be replaced by two or more lugs 12, formed at the side of the square hole by battering the upper surface of the collar or nut 9. (See Fig. 5.) The sleeve 6 is preferably provided with a flaring base 13, which is provided with a countersunk seat 14 for a small washer or packing 15, arranged between the sleeve 6 and the nut 9. A washer or packing 16 is also preferably provided on the under side of the collar 9 and around the threaded end of the body. The sleeve 6 and the collar 9 are loosely fitted between the flanged end of the body 2 and the collar 3 on said body, so that the sleeve 6 may be turned freely, or, rather, the body 2 may be turned within the sleeve and the end of the hose or pipe connection. When, however, the threaded end of the body 2 is screwed into the tire-nipple or other connection 17, being turned by means of the nut 9, the body 2 will be drawn down to force the nut 9 firmly upon the end of the connection 17 and bind the sleeve between the end 7 and the nut 9, making air-tight joints at all points. The nut 9 is preferably made of metal and used with leather or rubber washers 11 and 16; but by making the nut or collar 9 of rubber or fiber or like material the washers may be dispensed with.

The advantages of my invention are that the parts are loosely swiveled and may be turned freely with respect to one another, while as soon as the device is put into use and screwed down all joints are tightly closed.

Having thus described my invention, I claim as new and desire to secure by Letters Patent—

1. The combination, in a swivel connection, with a tubular body, of the sleeve swiveled thereon, said body being provided with means for securing it to the pipe or other connection, and a non-revoluble and longitudinally-movable collar or nut provided upon said body, as and for the purpose specified.

2. The combination, with a tubular body, of the sleeve swiveled thereon, said body being provided with a threaded end, and a non-revoluble but longitudinally-movable collar or nut arranged upon said body between said threaded end and said sleeve, substantially as described.

3. The combination, with a tubular body, of the sleeve swiveled thereon, the collar or nut having a limited longitudinal movement on said body, and means for holding the same against rotation on the body, said body being made to prevent the removal of said swiveled sleeve therefrom, substantially as described.

4. The combination, with the tubular body 2, provided with a polygonal collar 3, and a threaded end, of the nut or collar 9 engaged with said collar 3, and having a part to prevent its removal from the body 2, and a swiveled sleeve 6, substantially as and for the purpose specified.

5. The combination, with the tubular body 2, of the sleeve 6, the nut 9, said body and said nut having parts in engagement to prevent the rotation of the nut on the body, said body having a threaded end, and the washers or packings arranged on opposite sides of said nuts as and for the purpose specified.

In testimony whereof I have hereunto set my hand this 1st day of October, A. D. 1897.

CHARLES ANDERSON.

In presence of—
C. G. HAWLEY,
E. C. QUIMBY.